United States Patent [19]

Langkamp

[11] Patent Number: 5,680,805
[45] Date of Patent: Oct. 28, 1997

[54] POWER STEERING SERVO VALVE CONTROL ASSEMBLY

[75] Inventor: Bernd Langkamp, Stuttgart, Germany

[73] Assignee: Mercedes-Benz AG, Stuttgart, Germany

[21] Appl. No.: 618,383

[22] Filed: Mar. 19, 1996

Related U.S. Application Data

[63] Continuation-in-part of Ser. No. 560,713, Nov. 30, 1995, abandoned.

Foreign Application Priority Data

Nov. 18, 1994 [DE] Germany ............................ 44 41 165.0

[51] Int. Cl.$^6$ ........................................................ F15B 9/10
[52] U.S. Cl. ...................................... 91/375 A; 180/441
[58] Field of Search ................................ 91/375 R, 375 A; 180/429, 441

[56] References Cited

U.S. PATENT DOCUMENTS

| 4,699,174 | 10/1987 | Bishop | 91/375 A X |
| 5,115,879 | 5/1992 | Imura et al. | 91/375 A X |

FOREIGN PATENT DOCUMENTS

| 0176276 | 7/1991 | Japan | 91/375 A |
| 2238845 | 6/1991 | United Kingdom | 91/375 A |

Primary Examiner—Hoang Nguyen
Attorney, Agent, or Firm—Evenson McKeown Edwards & Lenahan, PLLC

[57] ABSTRACT

The invention relates to the control of a servo valve, in particular in a power steering system of a motor vehicle. Of two valve control parts which are coupled to one another with torsional elasticity by a torsion bar, one is connected merely non-positively to the assigned end of the torsion bar or to a part, which is arranged securely against rotation at the said end, in order to allow an adjustment while overcoming the non-positive engagement.

18 Claims, 2 Drawing Sheets

POWER STEERING SERVO VALVE CONTROL ASSEMBLY

This application is a continuation-in-part application of application Ser. No. 08/560,713 filed on Nov. 30, 1995, now abandoned.

BACKGROUND AND SUMMARY OF THE INVENTION

The invention relates to the control of a servo valve for a power steering system of a motor vehicle. The assembly includes two valve control parts which are arranged equiaxially, are rotatable relative to one another and are or can be connected to one another with torsional elasticity by means of a torsion bar which, in turn, is arranged or can be attached between an input side and an output side of a torque transmission drive train.

The servo valves of hydraulically assisted power steering systems in motor vehicles are often designed in the manner of rotary slide arrangements, a rotary slide being arranged so as to be movable in terms of rotation within a rotary-slide bush which is concentric thereto. The rotary movement takes place counter to the resistance of a torsion bar which is intended to return the rotary slide and the rotary-slide bush to a central position relative to one another. The rotary slide and the rotary slide bush form parts of a steering column, one of these parts respectively being connected in terms of drive and securely against rotation to the steering wheel and the other one of these parts being connected in terms of drive and securely against rotation to the input of a steering mechanism, for example to the pinion of a rack and-pinion steering system. Corresponding to the manual torque to be applied at the steering wheel, a rotary movement between the rotary slide and the rotary-slide bush occurs during steering manoeuvres so that a hydraulic servomotor controlled by the rotary slide arrangement can, in a manner which is basically known, produce a servo power which assists the respective steering manoeuvre.

It is important that, when the torsion bar is elastically unstressed, the rotary slide and the rotary slide bush assume their hydraulic central position precisely, in which the servomotor does not produce any servo power.

In customary power steering systems, in each case either the rotary slide or the rotary-slide bush is firstly connected securely against rotation to one end of the torsion bar or to a part arranged fixedly thereon. Then the other respective part is adjusted at the other end of the torsion bar, or a part fixedly connected thereto, and then fixed by pinning, a bore or a plurality of bores having to be made after the adjustment to receive the pin or pins.

Basically the same applies in a design according to German Patent Document DE 42 21 741 A1. In that publication, the torsion bar is non-positively connected to the valve control parts in that a region provided with notch toothing at one end of the torsion bar is inserted axially into an axial bore of the one valve control part, forming a first press-fit. Arranged at the other end of the torsion bar is a region whose diameter is slightly larger than an axial bore, which receives the said end, on the other valve control part. With this thickened region, the latter end of the torsion bar is inserted into the axial bore of the assigned valve control part, during which process the internal wall of the axial bore becomes permanently deformed, forming a second press-fit.

If, in the designs explained above, an error were to have occurred in the fixing of the torsion bar on the valve control parts, the entire servo valve arrangement would be worthless waste.

An object of the invention is now to simplify the production and adjustment by means of a new design.

According to the invention, this object is achieved in that the valve control part held non positively can be adjusted by rotation relative to the end of the torsion bar assigned to it, while overcoming the non-positive engagement, in that the non-positive engagement is effected by elastic deformation of the parts coupled non-positively to one another.

The invention is based on the general concept of connecting a valve control part to the torsion bar or a part fixedly connected thereto by means of a permanent elastic clamping which guarantees a sufficiently strong non-positive engagement to fix the respective adjustment during the operation of the servo valve and, on the other hand, owing to the elasticity, still allows an adjustment to be made even after assembly.

The invention not only avoids the possibility of waste being produced owing to an incorrect adjustment. It is also advantageous that an exceptionally high degree of freedom exists in respect of the point in time of the adjustment within a production sequence.

According to a particularly preferred embodiment of the invention, the non-positive engagement is produced by the interaction of an internal circumferential surface and an external circumferential surface of an inner part and an outer part which is concentric thereto, both circumferential surfaces being of opposed spiral design in cross-section with a low pitch of the spiral so that, by relative rotation, on the one hand the desired elastic clamping is produced between the two parts, and, on the other hand, a non-positive engagement which is sufficient for the functioning of the servo valve remains intact in the case of a subsequent rotary movement for adjustment purposes.

Since the rotary movement involved in the adjustment covers only a few angular degrees at the most, the safety of the clamping connection remains intact without impairment.

In respect of a good centricity of the arrangement, three spiral surface sections, which are formed equidistantly from one another, are provided respectively on both circumferential surfaces.

Other objects, advantages and novel features of the present invention will become apparent from the following detailed description of the invention when considered in conjunction with the accompanying drawings.

DETAILED DESCRIPTION OF THE DRAWINGS

Figure 1:
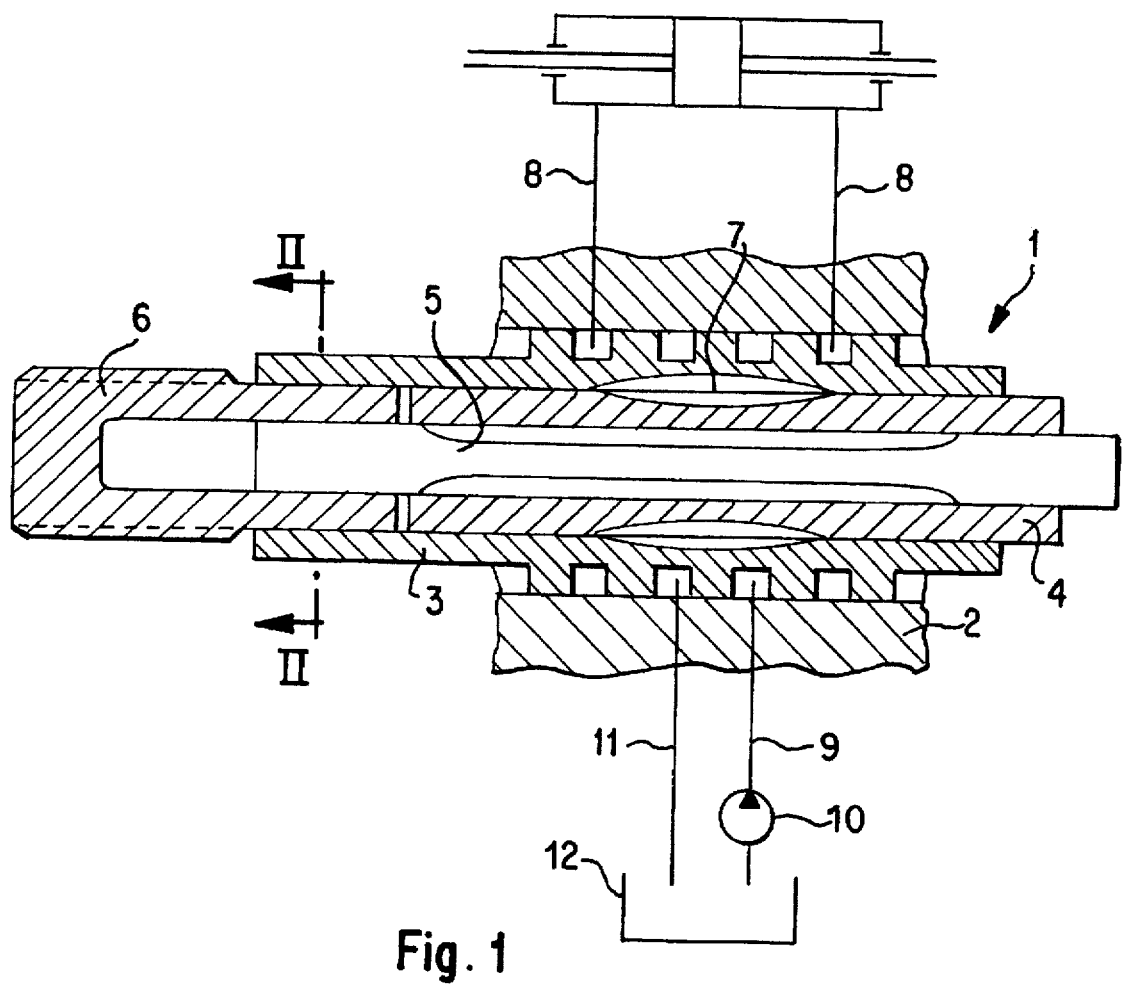
FIG. 1 shows a diagrammatic axial section of a servo valve designed in the manner of a rotary slide arrangement, constructed according to preferred embodiments of the invention.

A servo valve 1 designed in the manner of a rotary slide arrangement essentially comprises a stationary housing 2, a rotary-slide bush 3 arranged rotatably therein, and a rotary slide 4 which is arranged concentrically inside the rotary-slide bush 3 and is rotatable to a limited extent inside the rotary-slide bush 3. Moreover, the rotary-slide bush 3 and the rotary slide 4 are connected to one another by means of a torsion bar 5 which seeks to hold the rotary slide 4 in a central position inside the rotary-slide bush 3.

In the illustrated example of a power steering system of a motor vehicle, the rotary slide 4 can be connected in terms of drive to a steering wheel by means of a steering shaft (not illustrated), while the rotary-slide bush 3 is connected securely against rotation to the input side of a steering mechanism, for example to the pinion 6 of a rack-and-pinion steering system which is otherwise not illustrated.

Corresponding to the magnitude of a torque to be transmitted (between the steering wheel and the input of the steering mechanism), a movement occurs to a greater or lesser extent between the rotary-slide bush 3 and the rotary slide 4 relative to the central position, such that control edges 7, which are formed on the rotary slide 4 and on the rotary-slide bush 3 and are not illustrated in detail, are displaced relative to one another. This has the effect that a pressure difference of greater or lesser magnitude occurs between two motor ports 8 of the servo valve 1 in one direction or the other when an input port 9 of the servo valve 1 is connected to a hydraulic pressure source 10, generally a pump, and an output port 11 of the servo valve 1 is connected to a relatively pressureless hydraulic reservoir 12.

Such an arrangement is basically known.

It is important that the so-called hydraulic center between the rotary-slide bush 3 and the rotary slide 4 is present precisely at that moment when the torsion bar 4 is not elastically pressed either in one direction of rotation or the other, i.e. it must be guaranteed that no hydraulic pressure difference occurs between the motor ports 8 in the case of diminishing torsional stress of the torsion bar 5.

The appropriate adjustment is extremely simple due to the design according to the invention illustrated in the drawings and described below.

In the example illustrated, the rotary slide 4 and the pinion 6 are connected securely against rotation to the respectively assigned ends of the torsion bar 5 in any desired rotary settings, for example by the fact that the ends of the torsion bar 5 have a non-round cross-section and the rotary slide 4 and the pinion 6 have holders of a correspondingly non-round cross section.

Pinning of the ends of the torsion bar 5 to the rotor rotary slide 4 and the pinion 6 can also be used to connect same according to other contemplated embodiments.

The rotary-slide bush 3 is arranged so as to be adjustable relative to the body of the pinion 6. For this purpose, the body of the pinion 6 has, according to FIG. 2, a so-called 3K-profile having three circumferential surface sections 13 which are separated from one another by step-like transitions and are each of slightly spiral design. In the exemplary embodiment illustrated in FIG. 2, the radius of each circumferential surface section 13 increases in the circumferential direction directed anticlockwise, the pitch being in the region of 1/200. The rotary-slide bush 3 has a diametrically opposed internal circumferential region having the circumferential surface sections 14, such that a strong elastic, self-inhibiting clamping or wedging occurs between the body of the pinion 6 and the rotary-slide bush 3 when the latter is rotated by a specific amount anticlockwise relative to the pinion 6.

This clamping or wedging remains intact with sufficient non-positive engagement when a specific rotary movement of the rotary-slide bush 3 is carried out relative to the body of the pinion 6 in the course of an adjustment. If required, renewed adjustments can also take place.

Figure 2:
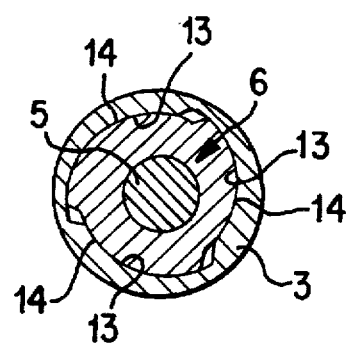
FIG. 2 shows a radial section corresponding to the section line II—II in FIG. 1.
Figure 2A:
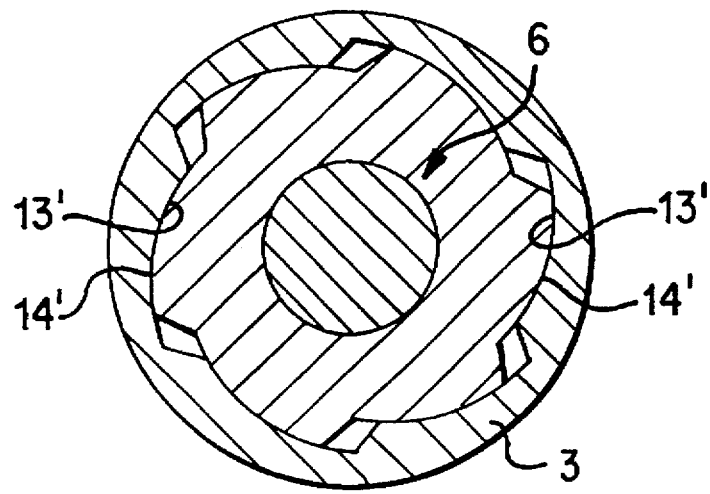
FIG. 2A is a view similar to FIG. 2, showing another preferred embodiment.
Figure 2B:
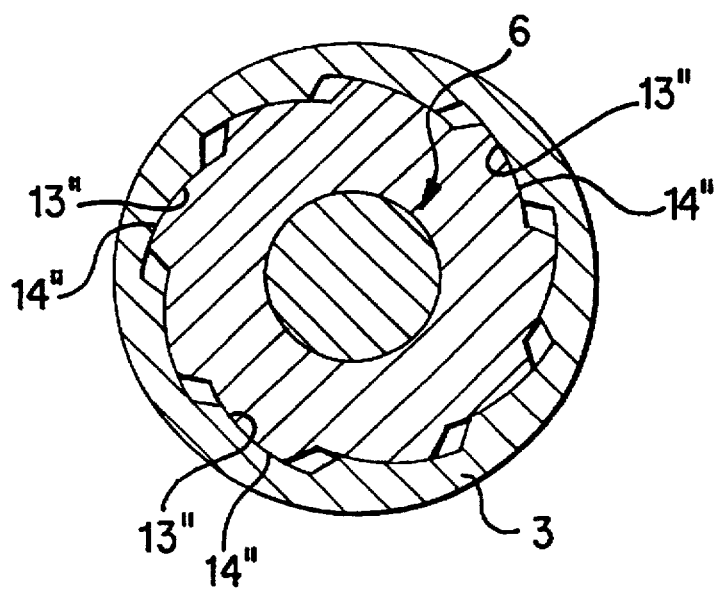
FIG. 2B is a view similar to FIG. 2, showing another preferred embodiment.

FIGS. 2A and 2B illustrate respective further preferred embodiments which are similar to the FIG. 2 embodiment, except for the number of surface sections 13', 14', 13", 14". In FIG. 2A, six such surface sections 13', 14' are provided. In FIG. 2B, nine such surface sections 13", 14" are provided. Other embodiments with a total number of surface sections equal to a whole number divisible by three are contemplated. These further embodiments with more than three sets of surface sections provide for advantageous precise positions of the pinion 6 and the bush 3.

It is basically also contemplated according to other embodiments to connect the rotary slide 4 to the assigned end of the torsion bar 5 or to a part, which is arranged securely against rotation at the said end, in the same manner—such as is the case in the connection between the pinion 6 and the rotary-slide bush 3. In such an arrangement, the connection between the rotary-slide bush 3 and the pinion 6 can be designed to be completely secure against rotation.

The arrangement illustrated is advantageous to the extent that the circumferential surface sections 13 and 14 interacting with one another are arranged on the body of the pinion 6 and on the rotary-slide bush 3 at a relatively great radial distance from the pinion axis, so that comparatively high torques between the pinion 6 and the rotary-slide bush 3 can already be tolerated in the case of slight surface pressing between the circumferential surface sections 13 and 14 without fearing maladjustment. Owing to the slight surface pressing, only elastic deformations occur on the body of the pinion 6 and on the rotary-slide bush 3 in the region of the circumferential surface sections 13 and 14, such that the non-positive engagement present during the adjustment remains intact, and is unchanged to the greatest extent, even after a long period of operation or a renewed adjustment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Servo valve control assembly for a motor vehicle power steering system comprising:

a rotary slide and a rotary slide bush arranged concentrically with respect to each other, said rotary slide and rotary slide bush being operable to control servo fluid supply to aid in steering in response to relative rotation of said rotary slide and rotary slide bush away from a central neutral rotative position, and a torsion bar connected between the rotary slide and rotary slide bush, said torsion bar serving to hold the rotary slide and rotary slide bush in said central neutral rotative position when said torsion bar is in an unstressed condition, wherein an elastic deformation adjusting connection is provided between the torsion bar and one of said rotary slide and rotary slide bush to accommodate adjustment of the central neutral rotative position of the rotary slide and the rotary slide bush, said elastic deformation adjusting connection comprising interengaging surfaces of said torsion bar and said one of said rotor slide and slide bush configured to change surface contact forces between said surfaces in dependence on relative rotation of said torsion bar and said one of said rotor slide and said one of said rotor slide and slide bush.

2. A servo valve control assembly according to claim 1, wherein said elastic deformation adjusting connection is formed by interengaged spiral external and internal circumferentially extending surface sections.

3. A servo valve control assembly according to claim 2, wherein three sets of spiral surface sections are provided around the circumference of said torsion bar.

4. A servo valve control assembly according to claim 3, wherein each of said spiral surface sections has a pitch with a value of about 1/200.

5. A servo valve control assembly according to claim 3, wherein each of said spiral surface sections has a pitch of between 1/150 and 1/250.

6. A servo valve control assembly according to claim 1, wherein said rotary slide is rotatably fixed to a manually operable steering wheel.

7. A servo valve control assembly according to claim 1, wherein said rotary slide bush is rotatably fixed to an output pinion of a steering gear.

8. A servo valve control assembly according to claim 7, wherein said output pinion is rotatably fixed to one end of said torsion bar.

9. A servo valve control assembly according to claim 6, wherein said rotary slide bush is rotatably fixed to an output pinion of a steering gear.

10. A servo valve control assembly according to claim 9, wherein said output pinion is rotatably fixed to one end of said torsion bar.

11. A servo valve control assembly according to claim 10, wherein said elastic deformation adjusting connection is provided on respective surfaces of the rotary slide bush and the output pinion.

12. A servo valve control assembly according to claim 7, wherein said elastic deformation adjusting connection is provided on respective surfaces of the rotary slide bush and the output pinion.

13. Servo valve control assembly for a motor vehicle power steering system comprising:

a rotary slide and a rotary slide bush arranged concentrically with respect to each other, said rotary slide and rotary slide bush being operable to control servo fluid supply to aid in steering in response to relative rotation of said rotary slide and rotary slide bush away from a central neutral rotative position, a torsion bar connected between the rotary slide and rotary slide bush; said torsion bar serving to hold the rotary slide and rotary slide bush in said central neutral rotative position when said torsion bar is in an unstressed condition, and an elastic deformation adjusting connection provided between the torsion bar and one of said rotary slide and rotary slide bush to accommodate adjustment of the central neutral rotative position of the rotary slide and the rotary slide bush, said elastic deformation adjusting connection comprising interengaging surfaces of said torsion bar and said one of said rotor slide and slide bush configured to change surface contact forces between said surfaces in dependence on relative rotation of said torsion bar and said one of said rotor slide and said one of said rotor slide and slide bush.

14. A servo valve control assembly according to claim 13, wherein said elastic deformation adjusting connection means includes interengaged spiral external and internal circumferentially extending surface sections.

15. A servo valve control assembly according to claim 14, wherein said interengaged surface sections are provided on an external surface of a steering system pinion gear which is fixed to one end of the torsion bar and on an internal surface at the rotary slide bush.

16. A servo valve control assembly for a motor vehicle power steering system comprising:

a rotary slide and a rotary slide bush arranged concentrically with respect to each other, said rotary slide and rotary slide bush being operable to control servo fluid supply to aid in steering in response to relative rotation of said rotary slide and rotary slide bush away from a central neutral rotative position, and a torsion bar connected between the rotary slide and rotary slide bush, said torsion bar serving to hold the rotary slide and rotary slide bush in said central neutral rotative position when said torsion bar is in an unstressed condition, wherein an elastic deformation adjusting connection is provided between the torsion bar and one of said rotary slide and rotary slide bush to accommodate adjustment of the central neutral rotative position of the rotary slide and the rotary slide bush, said elastic deformation adjusting connection comprising interengaging surfaces of said torsion bar and said one of said rotor slide and slide bush configured to change surface contact forces between said surfaces in dependence on relative rotation of said torsion bar and said one of said rotor slide and said one of said rotor slide and slide bush, and wherein said surfaces are disposed on a plurality of sets of spiral surface sections equal to a whole number divided by three provided around the circumference of said torsion bar.

17. A servo valve control assembly according to claim 16, wherein six of said sets of spiral surface sections are provided around the circumference of said torsion bar.

18. A servo valve control assembly according to claim 16, wherein nine of said sets of spiral surface sections are provided around the circumference of said torsion bar.

* * * * *